United States Patent [19]

Michaud

[11] Patent Number: 4,773,686

[45] Date of Patent: Sep. 27, 1988

[54] POINT FOR WOOD HOOK

[76] Inventor: Honoré J. Michaud, R.R. #291, Lamy/Quebec, Canada, G0L 1R0

[21] Appl. No.: 121,083

[22] Filed: Nov. 16, 1987

[51] Int. Cl.⁴ .............................................. B65G 7/12
[52] U.S. Cl. ...................................... 294/61; 294/17; 294/26
[58] Field of Search .................. 294/14, 15, 17, 19.1, 294/24, 26, 50.6, 61, 82.1, 120, 126; 7/104, 145, 158, 159, 161, 166; 125/42, 43; D8/1, 7, 14, 76

[56] References Cited

U.S. PATENT DOCUMENTS 2,864,643 12/1958 Juntunen ................................ 294/61
3,310,331 3/1967 Michaud ................................ 294/26
4,560,194 12/1985 Rybeck .............................. 294/17 X Primary Examiner—Johnny D. Cherry
Attorney, Agent, or Firm—Roland L. Morneau

[57] ABSTRACT

A point for a wood hook made of a steel rod tapering along part of its length and ending at its tip by a block member having the general shape of a truncated pyramid having a trapezoidal base. The cross-section of the tip of the tapering member adjacent the block member is such as to display sharp shoulders at the corners of the pyramid. The base of the pyramid is slightly slanted relative to the axis of the tapering member.

4 Claims, 1 Drawing Sheet

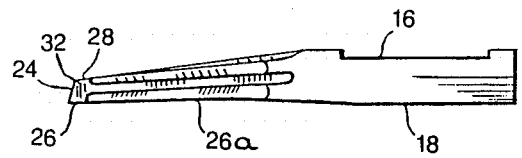
Fig.3
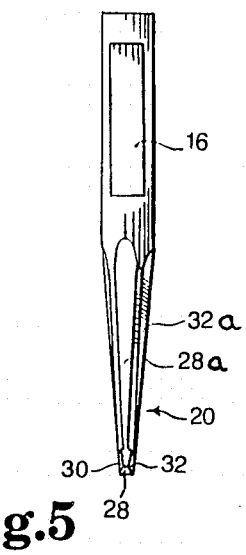
Fig.5
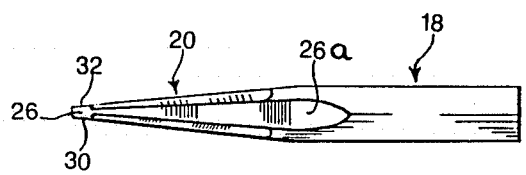
Fig.4
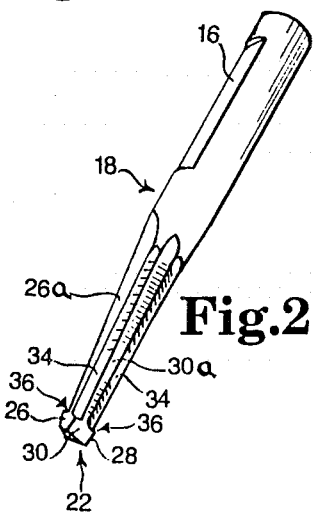
Fig.2
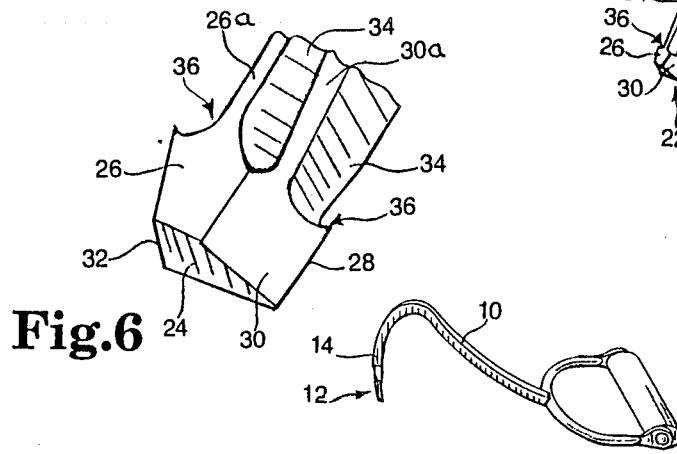
Fig.6
Fig.1

4,773,686

POINT FOR WOOD HOOK

BACKGROUND OF THE INVENTION

1. Field of the Invention

The present invention is directed to a point for a wood hook which enters and adheres to hard and soft wood during hot or cold weather.

2. Prior Art

Hooks to handle logs are known. The ones described in Canadian Patent Nos. 715,438, 493,307, 244,691 and 230,815 desribe wood engaging points which are generally tapered in cross-section. The shape of the point has been modified to handle the logs for different operations such as for the pickaroon described in Canadian Patent No. 606,478 and U.S. Pat. No. 4,560,194.

SUMMARY OF THE INVENTION

The point according to the present invention can penetrate easily in the log and be retained by it. It is intented to be used in both hard and soft wood whether the wood is warm or frozen.

The point is a block member located at the end of a generally tapering member and produces sharp shoulders around the end of the tapering member to help the retention of the point in the log. The block member has a trapezoidal tapering section which ends with a slanted base. The slanted base forms a slightly acute angle with a lateral side of the block member to facilitate the penetration of the point.

BRIEF DESCRIPTION OF THE DRAWING

FIG. 1 is a perspective view of a wood hook including a new point according to the invention, FIG. 2 is a perspective view of the new point, FIG. 3 is a side view of the cutting end point shown in FIG. 2, FIG. 4 is a side view of the cutting end point taken at 90° from the side shown in FIG. 3, FIG. 5 is a side view of the point take at 180° from the side shown in FIG. 4, and FIG. 6 is an enlarged perspective view of the end of the point shown in FIG. 2.

DETAILED DESCRIPTION OF THE INVENTION

The handle 10 which holds the point 12 is of a commonly known type. The curve of the handle may vary and usually affects the shape of the point 12. The point 12 is inserted in a socket at the end of the handle and is locked in place by tightening screw 14 which is aligned with a flat surface 16 provided on the shank 18 shown in FIG. 3.

The point is made of the cylindrical shank 18, a tapering member 20 extending from the shank and a block member 22 rigidly secured at the end of the tapering member 20 as shown in FIG. 2. The block member 22 has a trapezoidal base 24 and two trapezoidal opposite lateral faces 26 and 28 and two other opposite lateral faces 30 and 32. The base 24 tapers downwardly from face 26 to face 28. The base 24 is slanted relative to the lateral face 26 at an angle of about 60° to 80°. This angle is slightly acute and is the one which penetrates first in the wood. This angle also varies with the curvature of the handle 10.

The tapering member 20 flattens out progressively from the perimeter of the shank 16 along four reinforcing surfaces 26a, 28a, 30a and 32a which merge with the lateral faces 26, 28, 30 and 32 respectively. These reinforcing faces strengthen the joint at the intersection of the tapering member 20 and the block member 22.

The edges at the intersection of the four reinforcing faces of the tapering member 20 are levelled to form flats 34. These flats extend down to the upper surface of the block member 22 to form sharp shoulders 36 above the intersection of each lateral face 26, 28, 30 and 32. The purpose of these shoulders is to hook on to the wood fibers inside the wood once the block 22 has penetrated and prevent the retraction of the point. The sharp edges around the block member 22 and its pyramidal shape accentuate the penetration of the block member 22 inside the wood and cause the adjacent part of the tapering member 20 to also penetrate in the wood. The base 24 of block member 22 penetrates first. Because it is smaller than the upper part, it penetrates deeper and exerts a progressive lateral tension on the wood fibers when the point is unhooked from the log. The shoulders also play an important part because they progressively tear up the fibers in which they are gripped.

The surface 26a which is continuous with the face 26 is slightly curved. This curvature associated with the curvature of the handle 10 enables to lightly but positively grip the logs without deep penetration. This effect is desired when the logs need to be rolled without lifting.

The shoulders formed by the flats 34 need to be sufficiently protuberant to positively grip the wood fibers. However, such protuberance does not need to be excessive in as much as too many fibers would be unnecessarily destroyed and would hinder the retraction of the point.

In a specific embodiment, a point has a length of about 8 cm and a diameter of 1 cm for the shank 18. The tapering member 20 has a length of about 3 cm. The block member 22 is characterized by the following approximate dimensions:

Lateral faces 30: 3 mm×5 mm
Base 24: 5 mm×(1 mm+2 mm)
Face 26: 3 mm×(2 mm+2.5 mm)
Face 28: 3 mm×(1 mm+1.5 mm)

The steel used in the making of this point requires a high limit of elasticity. Steel having a high level of carbon and manganese and a limit of elasticity of about 100,000 lbs/sq. inch has been found suitable. The shoulders 36 exceed the periphery of the small end of the tapering member 20 by about half a millimeter.

Although the tapering member 20 has been described as being surrounded by a series of adjacent flat surfaces 26a, 28a, 30a, 32a and 34, these surfaces are obtained by a grinding process for the manufacturing of the points. If molding is used, the cross-section of the tapering member 20 could be generally oval. However, the sharp edges at the intersection of the surfaces 26a, 28a, 30a, 32a and 34 are preferred for cutting the wood fibers which facilitates the penetration of the part of the tapering member 20 adjacent the block member 22.

What is claimed is:

1. A point for a wood hook comprising a shank member and a tapering member integrally extending from said shank member, said tapering member ending with a block member having a generally trapezoidal base forming the end of said point, the said block member having two generally trapezoidal opposite lateral faces and two other opposite lateral faces having the general shape of a parallelogram, said tapering member having four lateral flats extending continuously from each of the four lateral faces of the block member, said tapering member also having four intermediate flats along the intersection of each of said four lateral flats, the intersection of said intermediate flats with the intersection of the four lateral faces of said block member forming salient shoulders having sharp edges, whereby said shoulders prevent the retraction of the point when the latter is inserted in a wood block.

2. A point as recited in claim 1, wherein the said base forms an angle of 60° to 80° with one of the said trapezoidal lateral faces.

3. A point as recited in claim 2, wherein one of the said lateral flats extending from said one of said trapezoidal lateral faces is slightly concave.

4. A point as recited in claim 1, wherein the shank member is slightly tilted relative to the tapering member

* * * * *